LA VERNE W. NOYES.
FLANGE FORMING MACHINE.
APPLICATION FILED APR. 25, 1911.
1,040,391.
Patented Oct. 8, 1912.
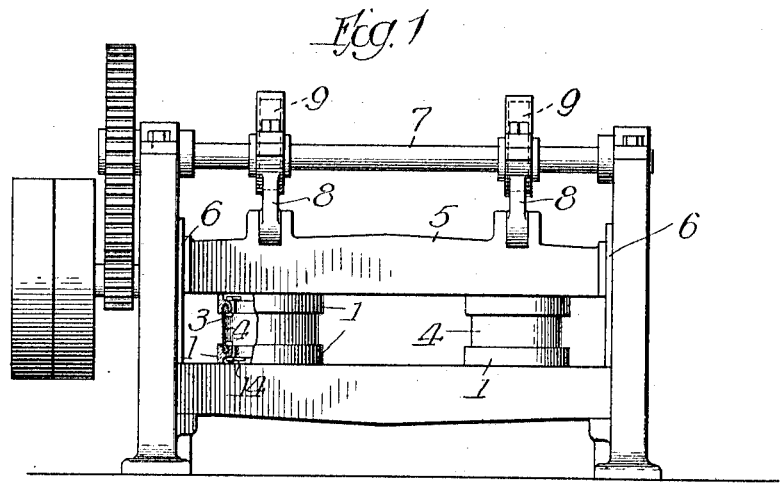
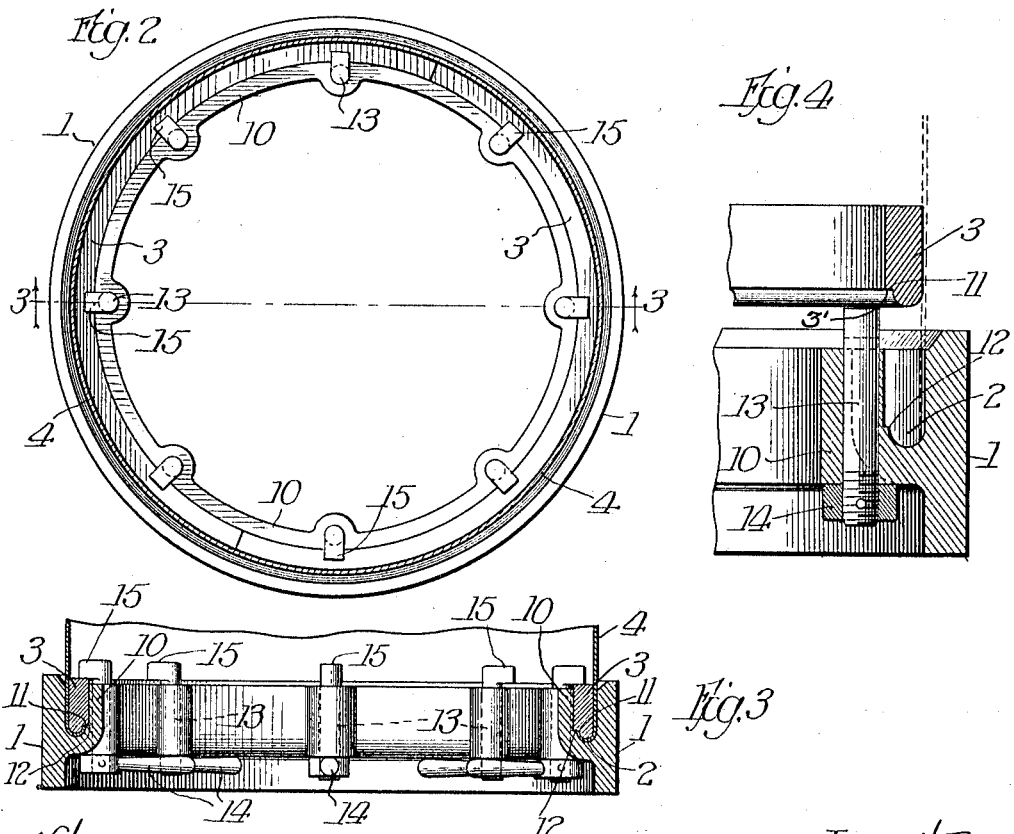
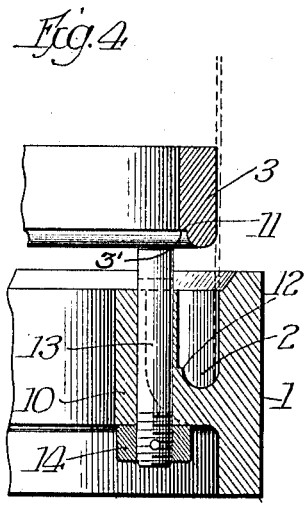
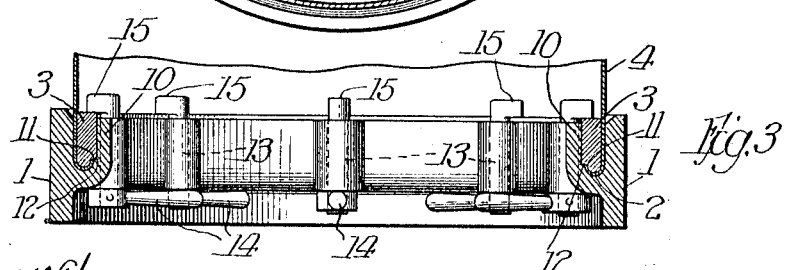
Witnesses:
Harold G. Barrett
Maurice Seedberger
Inventor:
LaVerne W. Noyes
by G. L. Cragg
Atty.

UNITED STATES PATENT OFFICE.

LA VERNE W. NOYES, OF CHICAGO, ILLINOIS.

FLANGE-FORMING MACHINE.

1,040,391.   Specification of Letters Patent.   Patented Oct. 8, 1912.

Application filed April 25, 1911. Serial No. 623,307.

*To all whom it may concern:*

Be it known that I, LA VERNE W. NOYES, citizen of the United States, residing at Chicago, in the county of Cook and State of Illinois, have invented a certain new and useful Improvement in Flange-Forming Machines, of which the following is a full, clear, concise, and exact description, reference being had to the accompanying drawings, forming a part of this specification.

My invention relates to machines for forming annular dished flanges on metallic cylinders, the machine of my invention being of particular service in forming dished flanges upon pulley rims for the purpose of strengthening the rims and affording means whereby the pulley rims may be anchored upon pulley rim supports without the aid of pulley spokes, though it is to be understood that I do not limit my invention to this purpose.

In practising my invention I employ a forming element provided with an open annular dished groove conforming to the exterior surface of the flange to be formed, a complemental forming element entering said groove and provided with a surface conforming to the interior surface of the flange to be formed and spaced apart from the grooved surface to provide a space conforming to the shape of the flange to be formed, and suitable means or agency for pressing an end of the cylinder into said space, the complemental forming element being constructed to engage the free end of the flange to prevent it from materially returning to the body of the cylinder. In the preferred embodiment of the invention the annular groove is circumferentially continuous as is also the forming element entering the same. Where the dished flanges are insetting and are formed upon both ends of the cylinder that is to be provided therewith, each ring like complemental forming element is made in relatively movable sections, when both insetting flanges are to be simultaneously formed, so that after said flanges are formed the complemental forming elements may be collapsed to permit of their withdrawal through the bore of the cylinder. Where the insetting flanges are formed upon each cylinder one at a time, the complemental ring like forming element employed in making the first flange need not be made in relatively movable sections, but the complemental ring like forming element employed to make the second flange should be made in relatively movable sections for the purpose stated.

I will explain my invention more fully by reference to the accompanying drawings showing the preferred embodiment thereof as such embodiment is constructed to provide both ends of a metallic cylinder with insetting flanges at one operation.

In the drawing Figure 1 is a view in elevation of a press that may be employed to exert the necessary power to dish the ends of a metallic cylinder, two devices having the novel features of my invention being illustrated in the press, one of these devices being shown in partial section and the other in elevation, though I do not limit myself to the number of devices nor the particular means whereby power is applied thereto; Fig. 2 is a plan view of a structure embodying the novel features of my invention; Fig. 3 is a sectional view on line 3 3 of Fig. 2, a part of a pulley rim being illustrated in each of Figs. 2 and 3; and Fig. 4 is a view on an enlarged scale of a part of the structure illustrated in Fig. 3, the forming ring being separated from the forming element provided with the forming groove.

Like parts are indicated by similar characters of reference throughout the different figures.

As the invention is illustrated, the novel parts thereof are arranged in symmetrically related sets, as illustrated in Fig. 1, whereby dished flanges are simultaneously formed on both ends of a cylinder. I will describe the lower set of parts, it being understood that a companion set symmetrically related to the set to be described may be employed or not as preferred. I will, therefore, more fully refer to the structure shown in Figs. 2, 3 and 4 where I have illustrated a forming element 1 provided with an open annular dished groove 2 conforming to the exterior surface of the flange to be formed, and a complemental forming element in the shape of a ring 3 adapted to enter said groove and provided with a surface conforming to the interior surface of the flange to be formed and spaced apart from the grooved surface to provide a space conforming to the shape of the flange to be formed, the structure being provided with some suitable mechanism for exerting pressure upon the cylinder 4 longitudinally thereof. I have shown in Fig. 1 a presser head 5 moved in vertical guides 6 by a shaft 7 in power driven connection with the presser head by means of pitmen 8 pivotally connected at their lower ends with the presser head and encircling eccentrics 9 at their upper ends, these eccentrics being rigidly mounted upon the shaft 7, the characteristics of the press illustrated in Fig. 1 being familiar to those skilled in the art. The forming ring 3 has an internal diameter which is in close sliding fit with the external diameter of an annular shoulder 10 provided upon the interior of the forming element 1 and separated a sufficient distance from the outer portion of said forming element 1 to permit of the reception of the forming ring 3 in the groove 2, the external diameter of the ring 3 being such that a clearance upon the exterior of this ring is afforded into which an end of the cylinder may be passed. The bottom of the ring 3 is supported at a distance from the bottom of the groove to conform to the shape of the dish of the flange to be struck upon the cylinder. To this end I desirably provide the ring with a sufficiently reduced internal diameter as to provide a shoulder 11 that engages a sub-shoulder 12 upon the exterior of the annular shoulder 10. The shoulder 11 also serves to limit the extent to which the inner edge of the dish may rise, and the portion 3' of the ring 3 where this shoulder 11 is located also serves so to engage the free end of the flange as to prevent this free end from materially returning toward the body of the cylinder. Vertical displacement of the ring 3 is prevented, during the flange forming operation, by means of the locking bolts 13 that are rotatably mounted in vertically disposed bearings provided in enlargements upon the annular shoulder 10. The lower ends of the bolts 13 are rigidly connected with operating handles 14, while the upper ends of these bolts are provided with holding jaws 15, the handles and bolt stems being in screw thread connection to enable the handles to be in proper position upon the bolt stems, whereafter the bolt stems and handles are rigidly secured together by any suitable means. By turning the handles 14 the jaws 15 may be brought into engagement with the top surface of the ring 3 to hold the shoulder 11 of this ring in engagement with the shoulder 12. When the parts are held together as illustrated in Fig. 3, the cylinder 4 is inserted into the annular space that intervenes between the forming elements 1 and 3, whereafter the cylinder 4 has pressure exerted thereupon longitudinally thereof to form the dished flange as illustrated in section in Fig. 3.

In the embodiment of the invention illustrated, in which flanges formed thereby are insetting, the ring 3 is made in relatively movable sections by being split into halves which may be removed one at a time when the holding jaws 15 are disengaged therefrom, whereby this ring may readily be removed from the interior of the cylinder.

While I have herein shown and particularly described the preferred embodiment of the invention I do not wish to be limited to the precise construction shown as changes may readily be made without departing from the spirit of my invention.

Having thus described my invention I claim as new and desire to secure by Letters Patent the following:—

A machine for forming annular dished flanges on cylinders including a forming element provided with an open annular dished groove conforming to the exterior surface of the flange to be formed; and a complemental forming element in the shape of a ring entering said groove and provided with a surface conforming to the interior surface of the flange to be formed and spaced apart from the groove surface to provide a space conforming to the shape of the flange to be formed and into which space an end of the cylinder may be pressed, said ring being provided with a shoulder serving to engage the free edge of the flange and thereby limit the depth of the flange dish.

In witness whereof, I hereunto subscribe my name this 22nd day of April A. D. 1911.

LA VERNE W. NOYES.

Witnesses:
 DANIEL R. SCHOLES,
 F. L. DOLE.